Patented July 18, 1933

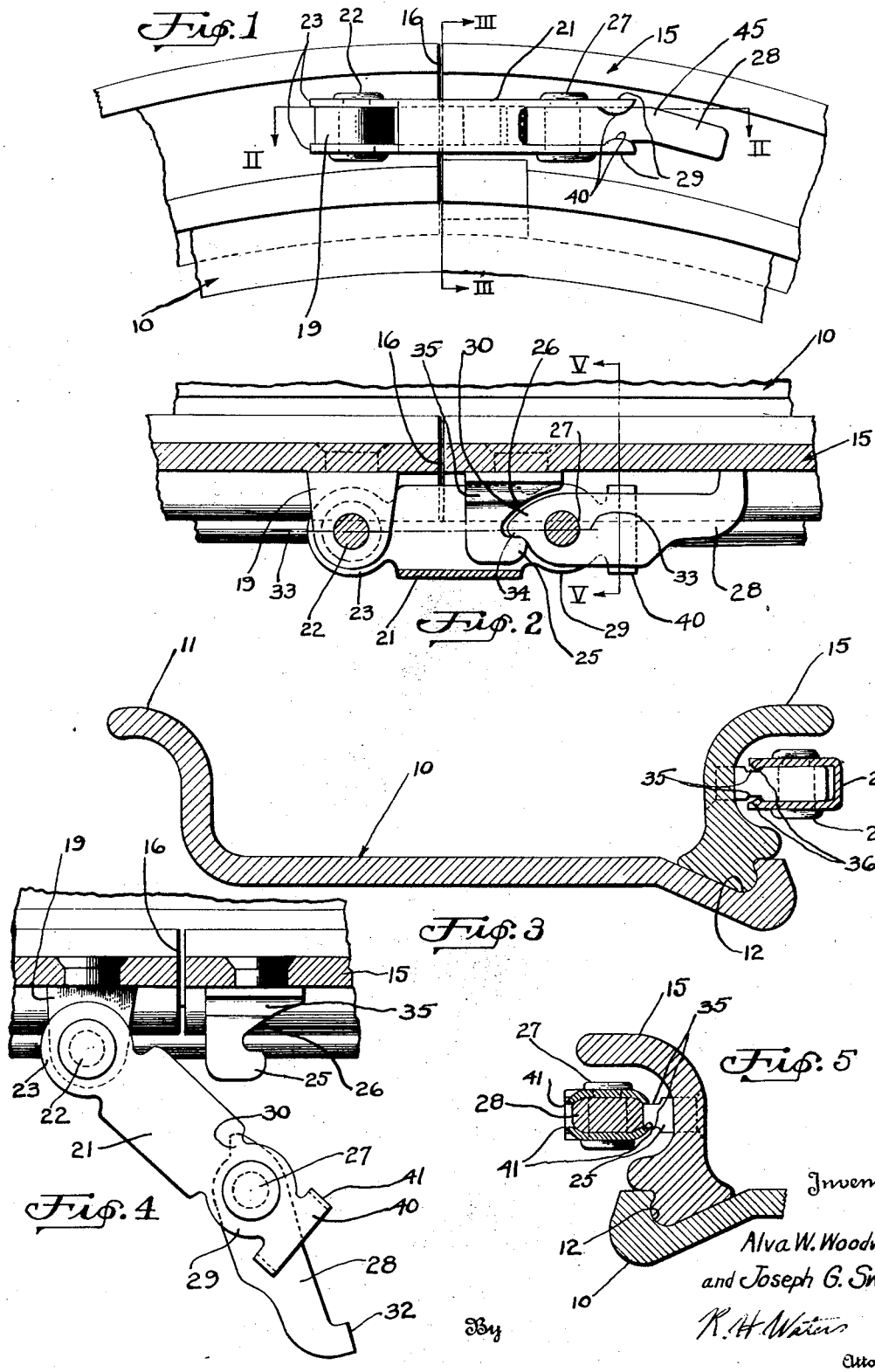

1,918,511

UNITED STATES PATENT OFFICE

ALVA W. WOODWARD AND JOSEPH G. SWAIN, OF AKRON, OHIO, ASSIGNORS TO THE GOODYEAR TIRE & RUBBER COMPANY, OF AKRON, OHIO, A CORPORATION OF OHIO

RIM LOCK

Application filed March 26, 1932. Serial No. 601,376.

This invention relates to rims and more particularly to composite rims and to means for positively securing the parts together.

It is an object of the present invention to provide a two part rim, which is normally adapted to be taken apart to facilitate the mounting of a tire upon the rim, with means for securely and positively locking the parts together.

Another object of the invention is to provide a rim having an endless base section and a removable split side ring with a lock for positively securing the ends of the split side ring together and to thus positively mount the side ring upon the base section.

Another object of the invention is to provide a lock for a side ring of a rim which is adapted to positively hold the ends of the side ring together at all times under all operating conditions.

Another object of the invention is to provide a lock for a rim section which is rattle proof and so designed that even after wear the parts do not become noisy.

Another object of the invention is to provide means for securing the ends of a split rim member together, which means are designed to stay positively locked under operating conditions.

Another object of the invention is to provide means for locking a split side ring on an endless base which means are entirely independent of the endless base.

Another object of the invention is to provide means for locking a split rim member to an endless rim member which means are designed and positioned to facilitate the operation thereof.

Another object of the invention is to provide locking mechanism of the type described which is positioned under the cover of a tire retaining flange so that it normally will be protected from bumps, etc.

The foregoing and other objects of the invention are achieved by the combination of means described below and illustrated in the accompanying drawing, wherein Fig. 1 is a side elevation of the locking means comprising the present invention;

Fig. 2 is a sectional view taken on line II—II of Fig. 1;

Fig. 3 is a cross-sectional view through the rim and lock mechanism taken on line III—III of Fig. 1;

Fig. 4 is a view similar to Fig. 2 with the locking mechanism illustrated in the opened position and with the link of the mechanism being shown in full lines; and Fig. 5 is a cross-sectional view taken on line V—V of Fig. 2.

The lock mechanism comprising the present invention is adapted to secure the ends of any split rim member positively together, but is particularly adapted and designed to be used in conjunction with a rim having an endless base section with a split side ring seating in a gutter at one side of the base section. The mechanism in this combination of rim parts serves to secure the ends of the split side ring together. Accordingly, the mechanism is illustrated and described in conjunction with this type of rim.

The numeral 10 indicates generally an endless rim base having a tire retaining side flange 11 on one side and a gutter 12 on the other side. The gutter 12 is adapted to receive a side ring, indicated generally at 15, which is transversely split as at 16. On one end of the side ring 15 is secured a post 19, which pivotally supports a link 21 by means of a pivot pin 22. The link 21 may be formed from a piece of sheet metal and, as illustrated in the drawing, is bent to form a U in cross-section, thus providing bifurcated extending portions 23 such as those pivoted on the pin 22.

Secured to the other end of the split side ring is a post 25 which is provided with a cam recess 26, as indicated in Figs. 2 and 4. Secured to the bifurcated ends 29 of the link 21 by a pivot pin 27 is a lever 28. The lever 28 is provided with a cam like extension 30 which is adapted to cooperate with the recess 26 on post 25, as illustrated in Fig. 2. The extending end of the lever 28 is provided with a boss 32 which serves to hold the main portion of the lever 28 away from the side ring 15 to permit the lever to be grasped so that it can be thrown. This also permits the insertion of a tool behind the lever.

In order to more positively lock the link 21 and lever 28 in their locking position, the pivot pins 22 and 27 are placed off center (see dot and dash line 33) from the contacting point 34 of the extension 30 and the post 25, so that normally the lever 28 will be forced against the side ring 15 when any stresses are applied on the side ring. In addition, the post 25 is provided with grooves 35 on both the upper and lower surfaces thereof and the sides of the link 21 are bent inwardly as illustrated at 36 in Fig. 3. The bent in portions 36 of the link 21 are adapted to be received in the grooves 35 to assist in holding the mechanism in the locked position and also to prevent rattling of the lock during operation or use of the rim.

If desirable or necessary, additional means can be provided to lock the mechanism in position and to assist in preventing any possible rattles, and to this end the bifurcated extensions 29 of the link 21 may be provided with extending portions 40 which are bent inwardly at their sides as illustrated at 41 in Fig. 5. The inwardly bent portions 41 tend to clamp down around the rounded lever 28 to hold the same in position and to prevent rattles. However, the metal in the extensions 40 and in the link 21 is such that the bent in portions 41 can be sprung back out of place by moving the lever 28 when it is desired to throw the lever. The projecting end of the lever 28 may be bent, as illustrated at 45 in Fig. 1, so that it will lie under the laterally projecting flange of the split side ring as seen from Fig. 3.

It is believed that the operation of the lock mechanism will be completely apparent from the drawing and the foregoing description. However, a brief résumé thereof follows:

The side ring 15 is first snapped into the gutter 12 of the endless rim base 10 when the lock mechanism is in the opening position shown in Fig. 4. Thereafter, the link 21 and the lever 28 are moved down adjacent the post 25 swinging about the pivot pin 22. The lever 28 is then moved inwardly, so that the extension 30 thereof engages in the recess 26 of the post 25, and further movement of the lever 28 about the pivot pin 27 causes the link 21 to move positively down over the post 25 so that the inwardly projecting portions 36 of the link 21 snap into the side grooves 35 on the post 25. As the lever 28 is pushed on down against the side ring, the cam toggle action of link 21 and lever 28 tends to draw the ends of the side ring very positively together and to thus contract the side ring very securely into the gutter 12 of the base rim 10. This very positive contraction exactly aligns the side ring with the rim base insuring a very good support for a tire. When the lever 28 has been completely pushed down in position, the inwardly projecting portions 41 of the extensions 40 snap around the lever 28 in the manner shown in Fig. 5 to very securely hold the lever 28. This, together with the engagement of the projections 36 in the grooves 35 of the post 25 and the off center relation of the pivot pins 22 and 27 and the contact portion 34, insures that the mechanism will stay locked under the severest operating conditions. In addition, these features also insure that the locking mechanism will be rattle proof and noiseless even after long use.

When it is desired to unlock the mechanism, the operator inserts a tool behind the lever 28, which operation is facilitated by the fact that the boss 32 holds the lever 28 away from the side ring. The lever may then be pried away from the side ring to the position shown in Fig. 4, at which time the side ring may be readily removed from the endless rim base by inserting a tool in an opening 46 provided at one end of the side ring.

From the foregoing it will be apparent that a mechanism has been provided for very positively locking the ends of a split rim member together, which mechanism is noiseless and rattle proof and which is particularly designed to stay locked under all operating conditions. The mechanism can be quickly and easily operated to lock the ends of a split rim member together or to unlock the same. It is compact and designed to fit into the rim structure in such a way that it can be most easily operated. This is achieved by a lateral movement of the locking levers. The mechanism, moreover, is positioned to be shielded from bumps and exposure.

In accordance with the patent statutes the best known form of the invention has been illustrated in detail in the drawing and described above. However it is to be understood that this is for purposes of illustration only and that the scope of the invention is defined in the appended claims.

We claim:

1. In combination, an endless rim having a gutter, a split side ring received in the gutter, a post secured to one end of the side ring and extending laterally thereof, a link pivotally secured to said post, a lever pivotally secured to the link, a laterally extending post secured to the other end of the split ring and having a recess therein adapted to receive one end of the lever, the pivotal points of the link and lever being off center with respect to the contacting point between the lever and the recess, means on the link cooperating with the recessed post for holding the link in the locked position, and means on the link cooperating with the lever for holding the lever in the locked position.

2. In combination, an endless rim having a gutter, a split side ring received in the gutter, a post secured to one end of the side ring, a link pivotally secured to said post, a lever pivotally secured to the link, a post secured to the other end of the split ring and having a recess therein adapted to receive one end of the lever, means on the link cooperating with the recessed post for holding the link in the locked position, and means on the link cooperating with the lever for holding the lever in the locked position.

3. In combination, an endless rim having a gutter, a split side ring received in the gutter, a post secured to one end of the side ring, a link pivotally secured to said post, a lever pivotally secured to the link, a post secured to the other end of the split ring and having a recess therein adapted to receive one end of the lever, and means on the link cooperating with the recessed post for holding the link in the locked position.

4. In combination, an endless rim having a gutter, a split side ring received in the gutter, a post secured to one end of the side ring, a link pivotally secured to said post, a lever pivotally secured to the link, a post secured to the other end of the split ring and having a recess therein adapted to receive one end of the lever, and means on the link cooperating with the lever for holding the lever in the locked position.

5. In combination, an endless rim having a gutter, a split side ring received in the gutter, a link pivotally secured to one end of the side ring, a lever pivotally secured to the link, a post secured to the other end of the split ring and having a recess therein adapted to receive one end of the lever, means on the link cooperating with the recessed post for holding the link in the locked position, and means on the link cooperating with the lever for holding the lever in the locked position.

6. In combination, an endless rim having a gutter, a split side ring received in the gutter, a link pivotally secured to one end of the side ring, a lever pivotally secured to the link, means secured to the other end of the split ring and having a recess therein adapted to receive one end of the lever, means on the link cooperating with the recessed means for holding the link in the locked position, and means on the link cooperating with the lever for holding the lever in the locked position.

7. In combination, an endless rim having a gutter, a split side ring received in the gutter, a link pivotally secured to one end of the side ring, a lever pivotally secured to the link, means secured to the other end of the split ring and having a recess therein adapted to receive one end of the lever, and means on the link cooperating with the recessed means for holding the link in the locked position.

8. In combination, an endless rim having a gutter, a split side ring received in the gutter, a link pivotally secured to one end of the side ring, a lever pivotally secured to the link, a post secured to the other end of the split ring and having a recess therein adapted to receive one end of the lever, and means on the link cooperating with the lever for holding the lever in the locked position.

9. A lock for a split rim member including a link pivotally secured to one end of the split member, a lever pivotally secured to the link, means on the other end of the split rim member adapted to receive one end of the lever, means independent of any off center relationship of the link and lever for holding the link in the locked position, and means independent of any off center relationship of the link and lever for holding the lever in the locked position.

10. A lock for a split rim member including a link pivotally secured to one end of the split member, a lever pivotally secured to the link, means on the other end of the split rim member adapted to receive one end of the lever, and means independent of any off center relationship of the link and lever for holding the link in the locked position.

11. A lock for a split rim member including a link pivotally secured to one end of the split member, a lever pivotally secured to the link, means on the other end of the split rim member adapted to receive one end of the lever, and means independent of any off center relationship of the link and lever for holding the lever in the locked position.

12. A lock for a split rim member including a link pivotally secured to one end of the split member, a lever pivotally secured to the link, means on the other end of the split rim member adapted to receive one end of the lever, and means independent of any off center relationship of the link and lever for holding the lever and link in the locked position.

13. The combination with an endless rim base and a detachable split side ring of a composite lock for securing the ends of the side ring together, said lock being entirely independent of the rim base, and a plurality of means operating on separate parts of the lock for maintaining the lock in its closed position.

14. A pair of rim members adapted to be secured together to form a tire carrying rim, one of said members being split, a link pivotally secured to one end of the split member, a lever pivotally secured to the link, means on the other end of the split rim member adapted to receive one end of the lever, means independent of any off center relationship of the link and lever for holding the link in the locked position, and means independent of any off center relationship of the link and lever for holding the lever in the locked position.

15. A pair of rim members adapted to be secured together to form a tire carrying rim, one of said members being split, a link pivotally secured to one end of the split member, a lever pivotally secured to the link, means on the other end of the split rim member adapted to receive one end of the lever, and means independent of any off center relationship of the link and lever for holding the lever and link in the locked position.

ALVA W. WOODWARD.
JOSEPH G. SWAIN.